United States Patent [19]

Baumann et al.

[11] 4,442,483
[45] Apr. 10, 1984

[54] RESONANT CIRCUIT INVERTER

[75] Inventors: Heinz Baumann; Werner Kühnel, both of Uttenreuth; Manfred Rattner, Buckenhof, all of Fed. Rep. of Germany

[73] Assignee: Siemens Aktiengesellschaft, Berlin & Munich, Fed. Rep. of Germany

[21] Appl. No.: 420,868

[22] Filed: Sep. 21, 1982

[30] Foreign Application Priority Data

Oct. 2, 1981 [DE] Fed. Rep. of Germany ....... 3139340

[51] Int. Cl.³ ............................................ H02M 7/537
[52] U.S. Cl. .................................... 363/131; 363/132; 363/135; 363/136
[58] Field of Search ....................... 363/27, 37, 64, 96, 363/132, 131, 136, 135; 331/113 S

[56] References Cited

U.S. PATENT DOCUMENTS 3,842,339 10/1974 Hoffman ............................ 363/136

FOREIGN PATENT DOCUMENTS 1108171 4/1968 United Kingdom ................ 363/136

*Primary Examiner*—William M. Shoop
*Attorney, Agent, or Firm*—Hill, Van Santen, Steadman & Simpson

[57] ABSTRACT

A resonant circuit inverter has an LC series resonant circuit and a switching device for connecting the resonant circuit with periodically alternating polarity to a dc voltage source, the switching device feeding a high voltage transformer. The resonant circuit inverter further includes an interstage transformer having a primary winding serving as the inductance in the LC resonant circuit and having a secondary winding connected to the primary winding of the high voltage transformer, the high voltage transformer having a secondary winding at which the load voltage is tapped.

1 Claim, 2 Drawing Figures

RESONANT CIRCUIT INVERTER

BACKGROUND OF THE INVENTION

1. Field of the Invention

The present invention relates to a resonant circuit inverter having an LC series resonant circuit and a switching device for connecting the resonant circuit with periodically changing polarity to a dc voltage source, and which feeds a high voltage transformer.

2. Description of the Prior Art

A resonant circuit inverter is known from German OS No. 28 34 561 having an LC series resonant circuit comprised of a capacitor and a high voltage transformer which has a primary winding connected in series with the capacitor. A dc voltage source is connected at the input of the resonant circuit inverter. The LC series resonance circuit is connected to the poles of the dc voltage source in a manner so as to periodically alternate the polarity of the connection by means of a switch device consisting of four thyristors which are respectively bridged by four free running diodes. The polarity at the points of connection of the series resonant circuit between respective pairs of thyristors thus periodically changes and an alternating voltage is transmitted by the high voltage transformer.

The LC series resonant circuit disclosed in German OS No. 28 34 561 consists of the capacitor and a total inductance which is comprised of the sum of the leakage inductance of the high voltage transformer and a lead inductance. The required oscillation inductance is thus load-dependent and will become greater or smaller depending upon the inverter power output. Because the leakage inductance of the high voltage transformer cannot be reduced at will without the high voltage transformer becoming too large, and because the lead inductance comprises a considerable portion of the total inductance, it is difficult to achieve an oscillation inductance which is as small as necessary in the known circuit described above, particularly in the case of high inverter power outputs. This problem becomes particularly acute if the load is disposed at a spatial distance from the inverter so that a long cable is required between the inverter and the load.

SUMMARY OF THE INVENTION

It is an object of the present invention to provide a resonant circuit inverter which has an LC series resonant circuit and a switching device for connecting the series resonant circuit with periodically changing polarity to a dc voltage source and which feeds a high voltage transformer wherein the lead inductance is very low so that the total oscillation inductance can be maintained low even with high inverter power outputs.

The above object is inventively achieved in a resonant circuit inverter having an interstage transformer having a primary winding which forms the inductance for the resonant circuit and having a secondary winding connected to the primary winding for the high voltage transformer. The high voltage transformer has a secondary winding at which the load voltage is tapped. The lead inductance of the leads between the secondary winding of the interstage transformer and the primary winding of the high voltage transformer is present in the resonant circuit only in an amount which is transformed or stepped by the transformation ratio of the interstage transformer.

DESCRIPTION OF THE PREFERRED EMBODIMENTS

Figure 1:
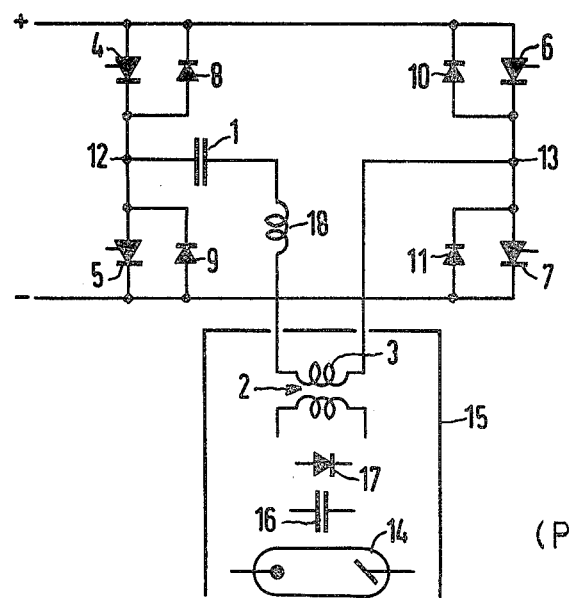
FIG. 1 is a circuit diagram of a known resonant circuit inverter.

A known resonant circuit inverter of the type disclosed in German OS No. 28 34 561 is shown in FIG. 1. As described above, this known resonant circuit inverter has an LC series resonant circuit consisting of a capacitor 1, a lead inductance 18 and the primary winding 3 of a high voltage transformer 2. The resonant circuit is connectable to a dc voltage source having the polarity shown in FIG. 1 in such a manner that the connection is undertaken with periodically changing polarity. This is achieved by a switch device consisting of four thyristors 4, 5, 6 and 7 which are respectively bridged by diodes 8, 9, 10 and 11 so that the polarity at the circuit nodes 12 and 13 periodically changes and an alternating voltage is thus transmitted by the high voltage transformer 2.

The output of the high voltage transformer in the circuit shown in FIG. 1 is utilized to feed an X-ray tube 14, which is placed in an oil-filled tank 15 together with a high voltage smoothing capacitor 16, a high voltage rectifier 17, and the high voltage transformer 2.

Figure 2:
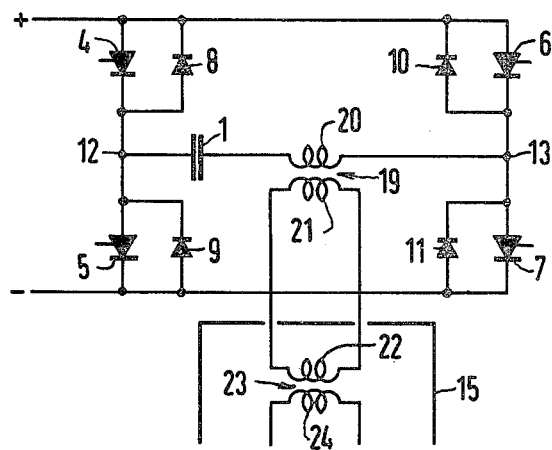
FIG. 2 is a circuit diagram of a resonant circuit inverter constructed in accordance with the principles of the present invention.

An improved resonant circuit inverter constructed in accordance with the principles of the present invention is shown in FIG. 2. Components of the circuit shown in FIG. 2 which are identical to those already described in connection with FIG. 1 have identical reference numerals. The high voltage transformer 2 of the prior art circuit shown in FIG. 1 is in the circuit shown in FIG. 2 replaced by an interstage transformer 19 having a primary winding 20 connected in series with the capacitor 1. The interstage transformer 19 steps the primary voltage up to a value in the magnitude of 2 kV through 4 kV. The secondary winding 21 of the interstage transformer 19 is connected to the primary winding 22 of the high voltage transformer 23, which has a secondary winding 24 at which an output voltage is tapped which may be utilized for feeding an X-ray tube or other device. The high voltage transformer 23 is disposed in the oil-filled tank 15, which may also contain other components as described in connection with FIG. 1.

If the lead inductance between the secondary winding 21 of the interstage transformer 19 and the primary winding 22 of the high voltage transformer 23 is designated as $L_L$, and the transformation ratio of the interstage transformer 19 is designated as $u_1$, the inductance which is present in the resonant circuit will have the value $L_L/(u_1)^2$ and will thus be negligibly small. The overall leakage inductance of the two transformers 19 and 23 influencing the resonant circuit does not change significantly in comparison to the leakage inductance of the resonant circuit inverter shown in FIG. 1 because the interstage transformer can be manufactured low-inductive. The interstage transformer 19 can be directly inserted in the inverter circuit so that the inductances of the leads to its primary winding 20 can be ignored. Accordingly, the total inductance can be maintained very low even in the case of a high power output of the transformer 23 and/or a long cable connection between the transformer 23 and the driven device connected thereto, such as an X-ray tube.

Although modifications and changes may be suggested by those skilled in the art it is the intention of the inventors to embody within the patent warranted hereon all changes and modifications as reasonably and properly come within the scope of their contribution to the art.

We claim as our invention:

1. A resonant inverter circuit comprising:

an LC series resonant circuit;

a switch means for connecting said resonant circuit with periodically alternating polarity to a dc voltage source;

a high voltage transformer having a primary winding and a secondary winding; and an interstage transformer interconnected between said resonant circuit and said high voltage transformer, said interstage transformer having a primary winding in said resonant circuit and a secondary winding connected to the primary winding of said high voltage transformer such that the primary voltage of said interstage transformer is twice stepped up, first to an intermediate voltage which is the primary voltage for said high voltage transformer and subsequently to the secondary voltage of said high voltage transformer at said secondary winding thereof, a load voltage being tapped at, said high voltage transformer secondary winding.

* * * * *